United States Patent [19]

Ginter

[11] Patent Number: 5,579,375
[45] Date of Patent: Nov. 26, 1996

[54] CALL TRANSFER WITHIN CELLULAR COMMUNICATIONS SYSTEM

[75] Inventor: Thomas Ginter, Garland, Tex.

[73] Assignee: Telefonaktiebolaget L M Ericsson, Stockholm, Sweden

[21] Appl. No.: 433,128

[22] Filed: May 2, 1995

Related U.S. Application Data

[63] Continuation of Ser. No. 71,693, Jun. 3, 1993, abandoned.

[51] Int. Cl.$^6$ .................................................. H04Q 7/38
[52] U.S. Cl. ........................ 379/59; 455/33.1; 379/63; 379/211
[58] Field of Search .................... 379/57, 59, 60, 379/67, 88, 210, 211, 212, 40, 51, 112, 128, 131, 119, 265; 455/33.1, 54.1

[56] References Cited

U.S. PATENT DOCUMENTS

| | | | |
|---|---|---|---|
| 3,736,392 | 5/1973 | Braun et al. | 179/18 |
| 4,674,115 | 6/1987 | Kaleita et al. | 379/201 |
| 4,876,707 | 10/1989 | Hashimoto | 379/57 |
| 4,893,335 | 1/1990 | Fuller et al. | 379/200 |
| 4,930,151 | 5/1990 | Walton et al. | 379/211 X |
| 4,942,598 | 7/1990 | Davis | 379/57 |
| 5,168,517 | 12/1992 | Waldman | 379/211 |
| 5,243,645 | 9/1993 | Bissell et al. | 379/211 |
| 5,253,288 | 10/1993 | Frey et al. | 379/210 X |
| 5,260,986 | 11/1993 | Pershan | 379/57 |
| 5,329,578 | 7/1994 | Brennan et al. | 379/59 X |

FOREIGN PATENT DOCUMENTS

| | | |
|---|---|---|
| WO92/08311 | 5/1992 | WIPO . |
| WO92/22164 | 12/1992 | WIPO . |
| WO92/22174 | 12/1992 | WIPO . |

OTHER PUBLICATIONS

Arzu Calis, TR45.2.5/93.2.25.03, Stage–1 Description for Extention Phone Services, Feb. 25, 1993.
Cheryl Blum, TR45.2.5/93.04.01.02, Proposed Text for Directory Hunt Group Feature (DNHG), Mar. 29–Apr. 2, 1993.
Kirk Carlson, TR45.2.5/93.05.06.02, Differentiating Between Extension Phone Service and Mobile Access Hunting, May 6, 1993.
Cheryl Blum, TR45.2.5/93.05.06.06, Proposed Text for Directory Hunt Group Feature (DNHG); May 3–May 7, 1993.

(List continued on next page.)

Primary Examiner—Curtis Kuntz
Assistant Examiner—William G. Trost
Attorney, Agent, or Firm—Jenkens & Gilchrist, P.C.

[57] ABSTRACT

A system and method provides multiple sequential call-forwarding transfers to a sequence of C-numbers within a conventional cellular radio communications system by providing a unique identifier for each call and enabling a home location register (HLR) to coordinate and disseminate multiple calls made to the same mobile station. The HLR stores, within a subscriber database, a sequence of C-numbers on a call-forwarding priority list to which calls are to be forwarded in the event a call cannot be completed to the mobile station. Each C-number is associated with sets of unique identification numbers and time stamps. When an incoming call is received at an originating mobile switching center (MSC), a transfer-to-number request message, containing a unique number identifying the request, is transmitted from the MSC to the HLR containing the subscriber database. In response, the HLR analyzes the request, searches the C-number priority list, and transmits to the MSC, the optimum C-number for completing the call. The HLR then updates the time stamp associated with that particular C-number and unique identifier. The MSC then attempts to complete the call. If the call cannot be completed, the process is repeated until the call is completed, the call is terminated, or the call-forwarding priority list is exhausted.

26 Claims, 10 Drawing Sheets

OTHER PUBLICATIONS

Kirk Carlson, TR45.2.5/93.06.10.03, Preliminary Comments on PN–2977, Jun. 10, 1993.

Electronic Industries Association, EIA/TIA Interim Standard: IS–41.1–B, Cellular Radio–Telecommunications Intersystem Operations: Functional Overview, Dec. 1991.

Electronic Industries Association, EIA/TIA Interim Standard: IS–41.2–B, Cellular Radio–Telecommunications Intersystem, Operations: Intersystem Handoff, Dec. 1991.

Electronic Industries Association, EIA/TIA Interim Standard: IS–41.3–B, Cellular Radio–Telecommunications Intersystem Operations: Automatic Roaming, Dec. 1991.

Electronic Industries Association, EIA/TIA Interim Standard: IS–41.5–B, Cellular Radio–Telecommunications Intersystem Operations: Data Communications, Dec. 1991.

| INFORMATION ELEMENT | CONTENTS | LENGTH |
|---|---|---|
| BILLING ID | SWID + ID NO. + SEGMENT COUNT | 7 OCTETS |

WHERE:

OCTETS 1-2   = ANCHOR SID
    OCTET   3       ANCHOR SWITCH NUMBER
    OCTETS 4-6   = ID NUMBER
    OCTET   7     = SEGMENT COUNTER
                      BITS 7-1 = NUMBER OF INTERSYSTEM HANDOFFS
                      BIT   8   = 1 INDICATES THE SERVING MSC UPON CALL
                                          DISCONNECT

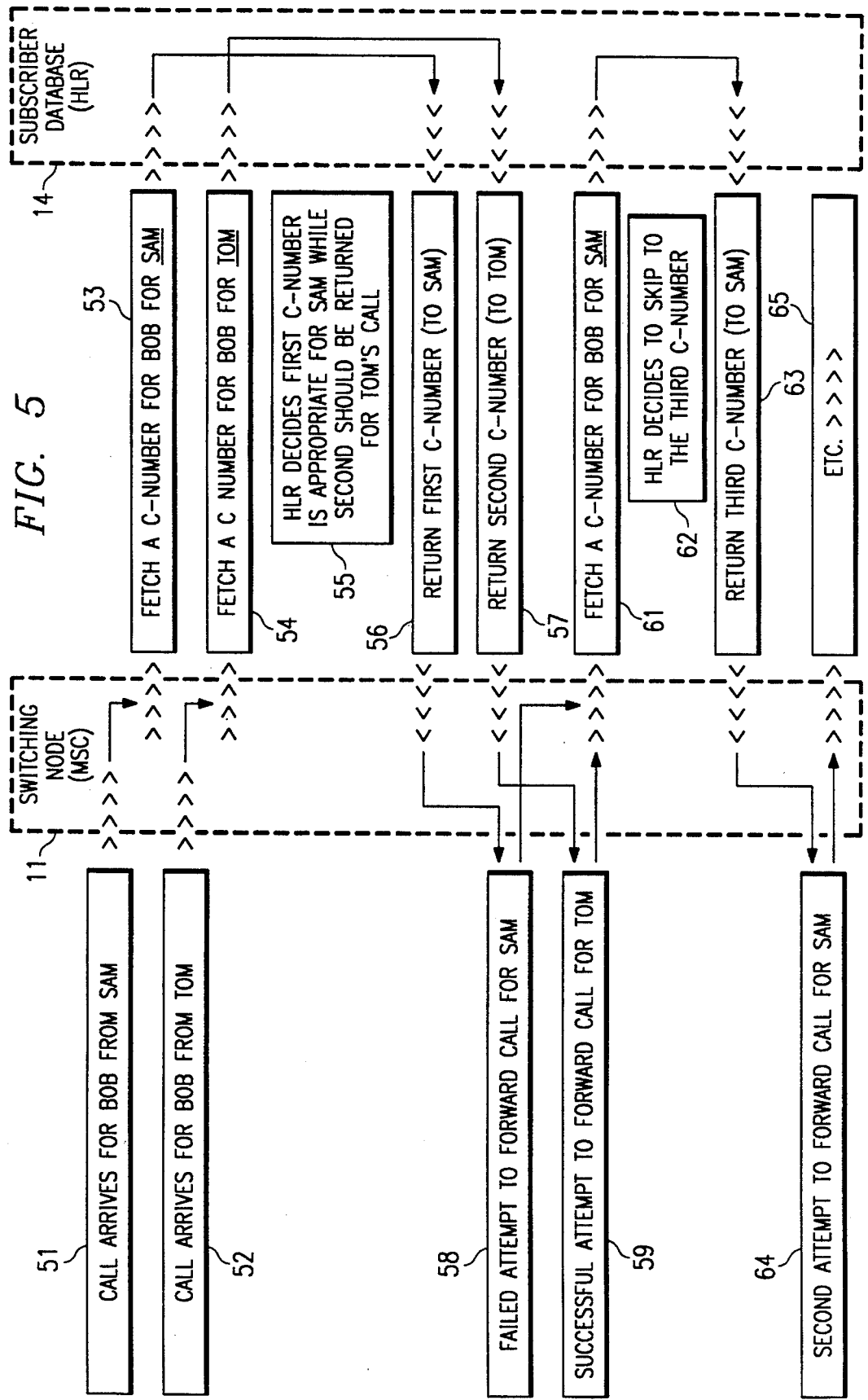

| OPERATION: LocationRequest | TIMER: LRT | |
|---|---|---|
| INVOKE PARAMETERS | REFERENCE | TYPE |
| Digits (dialled) | 0.2.19 | M |
| MSCID (Originating) | 0.2.20 | M |
| SystemMyTypeCode (Originating) | 0.2.21 | M |
| BillingID | 0.2.1 | M |
| PC_SSN (MSC-N or MSC-G) | 0.2.31 | O |
| RETURN RESULT PARAMETERS | REFERENCE | TYPE |
| MSCID (Serving MSC or VLR) | 0.2.20 | M |
| MobileIdentificationNumber | 0.2.6 | M |
| MobileSerialNumber | 0.2.7 | M |
| AccessDeniedReason | 0.2.18 | O |
| Digits (destination/routing) | 0.2.19 | O |
| Digits (carrier) | 0.2.19 | O |
| PC_SSN (Serving MSC or VLR) | 0.2.31 | O |
| RETURN ERROR CODE | REFERENCE | |
| Error Code | 0.1.1.3 | |
| RETURN ERROR PARAMETERS | REFERENCE | TYPE |
| FaultyParameter | 0.2.25 | O |

*FIG. 7   (PRIOR ART)*

| OPERATION: RoutingRequest | TIMER: RRT | |
|---|---|---|
| INVOKE PARAMETERS | REFERENCE | TYPE |
| MSCID (Originating) | 0.2.20 | M |
| SystemMyTypeCode (Originating) | 0.2.21 | M |
| MobileIdentificationNumber | 0.2.6 | M |
| MobileSerialNumber | 0.2.7 | M |
| BillingID | 0.2.1 | M |
| PC_SSN (MSC-N or MSC-G) | 0.2.31 | O |
| LocationAreaId | 0.2.32 | O |
| RETURN RESULT PARAMETERS | REFERENCE | TYPE |
| MSCID (Serving) | 0.2.20 | M |
| AccessDeniedReason | 0.2.18 | O |
| Digits (destination/routing) | 0.2.19 | O |
| PC_SSN (Serving MSC) | 0.2.31 | O |
| RETURN ERROR CODE | REFERENCE | |
| Error Code | 0.1.1.3 | |
| RETURN ERROR PARAMETERS | REFERENCE | TYPE |
| FaultyParameter | 0.2.25 | O |

*FIG. 8   (PRIOR ART)*

| OPERATION: RedirectionRequest | TIMER: RDRT | |
|---|---|---|
| INVOKE PARAMETERS | REFERENCE | TYPE |
| MobileIdentificationNumber | 0.2.6 | M |
| MobileSerialNumber | 0.2.7 | M |
| FeatureIdentifier | 0.2.17 | M |
| BillingID | 0.2.1 | M |
| RETURN RESULT PARAMETERS | REFERENCE | TYPE |
| Empty | | |
| RETURN ERROR CODE | REFERENCE | |
| Error Code | 0.1.1.3 | |
| RETURN ERROR PARAMETERS | REFERENCE | TYPE |
| FaultyParameter | 0.2.25 | O |

*FIG. 9*
*(PRIOR ART)*

| OPERATION: TransferToNumberRequest | TIMER: TTNRT | |
|---|---|---|
| INVOKE PARAMETERS | REFERENCE | TYPE |
| MobileIdentificationNumber | 0.2.6 | M |
| MobileSerialNumber | 0.2.7 | M |
| SystemMyTypeCode (MSC) | 0.2.21 | M |
| FeatureIdentifier | 0.2.17 | M |
| RETURN RESULT PARAMETERS | REFERENCE | TYPE |
| Digits (destination) | 0.2.19 | M |
| Digits (carrier) | 0.2.19 | O |
| RETURN ERROR CODE | REFERENCE | |
| Error Code | 0.1.1.3 | |
| RETURN ERROR PARAMETERS | REFERENCE | TYPE |
| FaultyParameter | 0.2.25 | O |

*FIG. 10*
*(PRIOR ART)*

CALL TRANSFER WITHIN CELLULAR COMMUNICATIONS SYSTEM

This application is a continuation of application Ser. No. 08/071,693, filed on Jun. 3, 1993, which was abandoned upon the filing hereof.

BACKGROUND OF THE INVENTION

1. Field of the Invention

The present invention relates to call handling within cellular radio communication systems and, more particularly, to the transfer and redirection of calls within said systems.

2. History of the Prior Art

Call handling within telecommunications systems has, in recent years, become increasingly sophisticated. For example, subscribers have greater numbers of call handling features available to them as a result of the implementation of more sophisticated software within modern stored-program control-switching systems. Features such as call forwarding, call waiting, and selective call blocking are now commonly incorporated into a "service profile" of each subscriber.

Cellular radio telecommunications systems have also offered increasing numbers of special subscriber features. These features are commonly provided by an operator of the cellular system. In general, each mobile telephone subscriber in a cellular system is associated with a specific "home location" to which calls for that subscriber are normally routed by the telecommunications network, based upon the directory number assigned to that subscriber. Each subscriber's home location is further associated with a particular mobile switching center (MSC) and/or a home location register (HLR) which contains a database of information about the subscriber. The database includes the service profile of that subscriber, including a list of all of the special service features to which the subscriber subscribes as well as information concerning the most likely current location of the mobile subscriber within the network. A subscriber's home MSC or HLR is consulted each time a call is received for the subscriber, and the call is routed to another location within the network if the HLR database indicates that the subscriber is currently located elsewhere.

All of the systems operating within a cellular radio telecommunications network use specific and common procedures to handle calls so that the systems can communicate with one another and behave i n a uniform fashion. These call-handling procedures are set forth in so-called "Standards" which must be complied with by the manufacturers and operators of cellular network infrastructure equipment in order to provide commonality and compatibility within the network. One such Standard used in North America is entitled "Cellular Radio-telecommunications Intersystems Operation" established by the Telecommunications Industries Association (TIA), and is often referred to as IS-41. IS-41 is hereby incorporated by reference. IS-41 provides standards through which a calling party (a so-called "A-number") is connected to a called party (a so-called "B-number"). IS-41 also provides a call-handling feature which forwards calls to a second telephone number (a so-called "C-number") in the event a call is directed to a mobile station B-number which is busy or does not answer. A "Transfer-to-Number Request" message forwards the call to a number which is pre-selected by the subscriber as a number where the call can most likely be completed. If, however, the forwarded call arrives at the C-number and goes unanswered, no further options are available, and the attempted connection fails. It would be much more desirable if the call could continue to be forwarded to a series of C-numbers until finally completed. This is not possible under the present procedures.

In U.S. Pat. No. 3,736,382 to Braun et also, a memory device is disclosed for use in a call forwarding arrangement wherein a connection directed to a station may be completed to another station arbitrarily preselected by the first station. However, there is no mention of multiple call-forwarded cases, and the invention does not, in fact, support such a technique.

U.S. Pat. No. 4,876,707 to Hashimoto discloses a telephone call-forwarding device which receives a call (or multiple calls serially) and records the calling party number(s ). The device interacts with a paging system to inform the called party that calls are being received. The called party returns a call to the device which results in connection to either an incoming call which has waited, or places an outgoing call via a dialback maneuver. However, the device is limited in that the stored numbers must be stored in the same device that accesses them, and the numbers must be accessed serially. A device is needed which overcomes each of these limitations.

U.S. Pat. No. 4,942,598 to Davis discloses a telephone answering machine which receives a call and uses the received automatic number identification (ANI) to perform several actions which may include call forwarding. The Davis machine must receive ANI information to perform its functions, and the patent is specifically limited to the use of such information. The machine is limited to single incoming calls, and again must store the forwarding numbers in the same device as has need to access them. A device is needed which overcomes each of these limitations and does not require ANI information to function.

One suggested modification of the call forwarding feature under IS-41 is the addition of a character or index parameter to the Transfer-to-Number Request message. This technique is illustrated in FIG. 1 wherein an illustrative call arrives at an MSC 11 for "Bob" from "Sam", and is sequentially forwarded by the MSC 11 to multiple C-numbers. The call arrives for Bob from Sam at step 12, and the MSC 11 specifies an index parameter at step 13 that directs an HLR 14 to retrieve a first C-number for Bob from the C-number list in its subscriber database. This number is returned to the MSC 11 at step 15, and an attempt is made to forward the call. It can be seen that when an attempt to forward the call to the first C-number for Bob fails at step 16, the MSC 11 changes the index parameter to fetch a second C-number for Bob at step 17. The second C-number for Bob is returned to the MSC 11 at step 18, and at step 19 another attempt is made to forward the call. This sequence is repeated at step 20 until either the call is completed or the C-number list is exhausted.

Although such a solution is technically feasible within the current signalling protocol, this approach has several disadvantages. First, this configuration would not allow the HLR 14 alone to coordinate multiple calls to the same number, but would require the intervention of the MSC 11 through which the call was being routed. The MSC 11, therefore, would have to maintain additional state information about a call in progress, that is, data concerning which C-number is being requested. This would require additional software in multiple MSCs 11, thereby making it more difficult and expensive to implement. Second, the addition of an index parameter into the IS-41 signalling protocol would introduce formal state information into this transaction oriented protocol. Such a modification to this industry standard would be controversial, and would require considerable time and expense to study its potential far-reaching consequences and gain approval from various standards committees. Third, when high volumes of simultaneous calls come into a cellular group, where some mobile phones are "busy", "idle", "inactive", or providing "no answer", the index technique is wholly inadequate to handle the resulting call-forwarding scenarios. Finally, it is only possible to implement the index technique when the MSC is a single node; the index technique will not work when several MSCs are networked.

FIG. 2 illustrates the situation in which the index technique is used to forward two calls which arrive near simultaneously for "Bob" from both "Sam" and "Tom". At step 21 a call arrives for Bob from Sam, and the MSC 11 specifies an index parameter at step 22 that directs the HLR 14 to retrieve the first C-number for Bob from its subscriber database. Before that C-number can be returned to Sam, however, another call arrives for Bob from Tom at step 23. Once again, the MSC specifies the index parameter at step 24 that directs the HLR 14 to retrieve the first C-number for Bob from its subscriber database. Thereafter, at step 25, the first number on the C-number list is returned to the MSC 11 which, in this illustration, fails in its attempt to forward the call for Sam at step 26. Near simultaneously, the first number on the C-number list is also returned at step 27 to the MSC 11 in response to the call from Tom. The MSC 11 attempts to forward this call at step 28, but this attempt will always fail since the call from Sam was forwarded to the same C-number only moments before.

Steps 29 and 31 illustrate that if both attempts to forward calls to the first C-number fail, then the MSC 11 will send two messages to the HLR 14 specifying the index parameter that retrieves the second C-number for Bob from its subscriber database. In steps 32 and 33, the second C-number is sent to the MSC 11 once for the call from Sam and once for the call from Tom. In steps 34 and 35, the MSC 11 attempts to forward both the call from Sam and the call from Tom to the second C-number. Since the calls are being transacted nearly simultaneously, the specific order of the messages illustrated could vary, but the end result is the same: only one of these calls can be successfully completed. As shown at step 36, this process may be repeated until the C-number list is exhausted. Therefore, when the index-parameter technique is used to forward multiple incoming calls, there is a waste of time and network resources since the MSC 11 attempts to forward multiple calls to the same C-number.

A more serious problem arises when features are implemented which allow a high number of near simultaneous calls to occur, and these calls arrive on numerous "gateway" MSCs. Since multiple MSCs may be attached to a single HLR (FIG. 4), more than one MSC may be transacting calls to the same party. Therefore, effective call-forwarding coordination cannot be performed by utilizing index parameters in the MSCs. Call-forwarding coordination must take place in the HLR.

Thus, a need still exists to provide a means for allowing call transfer to a sequence of numbers on a C-number list, totally under the control of the HLR, and without involving additional parameter storage or switching action by the MSC. With the current system, if a second Transfer-to-Number Request message is issued in the HLR, only a single C-number may be accessed. Additional support, for example, a counting mechanism for traversing a linked list of C-numbers, is needed. Additional software overhead is most efficiently added at the HLR rather than in all of the mobile switching centers (MSCs). The present invention uses a preexisting Billing ID number to uniquely identify calls arriving at the MSC. This unique identifier is passed to the HLR where it is translated into a pointer for sequentially forwarding calls to the numbers on a C-number list until the call is successfully completed or the C-number list is exhausted.

SUMMARY OF THE INVENTION

In one aspect, the present invention includes a method for providing multiple sequential call-forwarding transfers to a sequence of C-numbers within a conventional cellular radio communications system by providing a unique identifier for each call and enabling a home location register (HLR) to coordinate multiple calls made to the same mobile station, and forward each call to the optimum call-forwarding C-number for completion of the call.

The HLR stores, within a subscriber database, a sequence of C-numbers on a call-forwarding priority list to which calls are to be forwarded in the event a call cannot be completed to the mobile station. When an incoming call is received at an originating mobile switching center (MSC), a Transfer-to-Number Request message is transmitted from the MSC to the HLR containing the subscriber database. The Transfer-to-Number Request message contains a unique number, such as a Billing ID number, identifying the request message.

The method of the present invention includes programming the HLR to analyze a Transfer-to-Number Request along with the HLR's priority list of call-forwarding numbers, and to transmit to the MSC, the optimum C-number from the priority list for completion of the call. The MSC then attempts to complete the call to that C-number. If the call cannot be completed, the MSC transmits a second Transfer-to-Number Request message to the HLR containing the same unique number, which the HLR uses to identify the request message as the second request for this call. In response, the HLR transmits to the MSC, the C-number from the call-forwarding priority list which is the next most likely number to result in call completion. The MSC then attempts to complete the call to the second C-number. The HLR continues to retrieve C-numbers from the call-forwarding priority list, and the MSC attempts to complete the call to the sequence of C-numbers, until the call is completed, the call is terminated, or the call-forwarding priority list is exhausted.

In another aspect, the present invention is a system for forwarding a telephone call for a mobile station to a sequence of call-forwarding numbers within a conventional cellular radio telephone system. The system comprises a home location register (HLR) which is associated with the mobile station, and which stores the sequence of call-forwarding numbers in a database. The system also includes a means for transmitting a request message to the HLR requesting a call-forwarding number. The request message is identified by means of a unique identifying number. The HLR includes means for retrieving and forwarding the next highest priority call-forwarding number each time a request message is received, thereby enabling the HLR to retrieve and forward a sequence of call-forwarding numbers to a single calling party.

BRIEF DESCRIPTION OF THE DRAWING

For a more complete understanding of the present invention and for further objects and advantages thereof, reference may now be had to the following description taken in conjunction with the accompanying drawings in which:

FIG. 5 is a simplified flow diagram illustrating the steps performed by the present invention in which a home location register coordinates the forwarding of near-simultaneous calls to a sequence of C-numbers retrieved from a subscriber database;

FIG. 7 (Prior Art) is an illustrative indication of a standard Location Request message sent from a mobile switching center to a home location register in a cellular telephone network;

FIG. 8 (Prior Art) is an illustrative indication of a standard Routing Request message sent from an originating mobile switching center or a home location register to a serving mobile switching center in a cellular telephone network;

FIG. 9 (Prior Art) is an illustrative indication of a standard Redirection Request message sent from a serving mobile switching center to an originating mobile switching center in a cellular telephone network;

FIG. 10 (Prior Art) is an illustrative indication of a standard Transfer-to-Number Request message sent from a mobile switching center to a home location register in a cellular telephone network;

DETAILED DESCRIPTION

Figure 3:
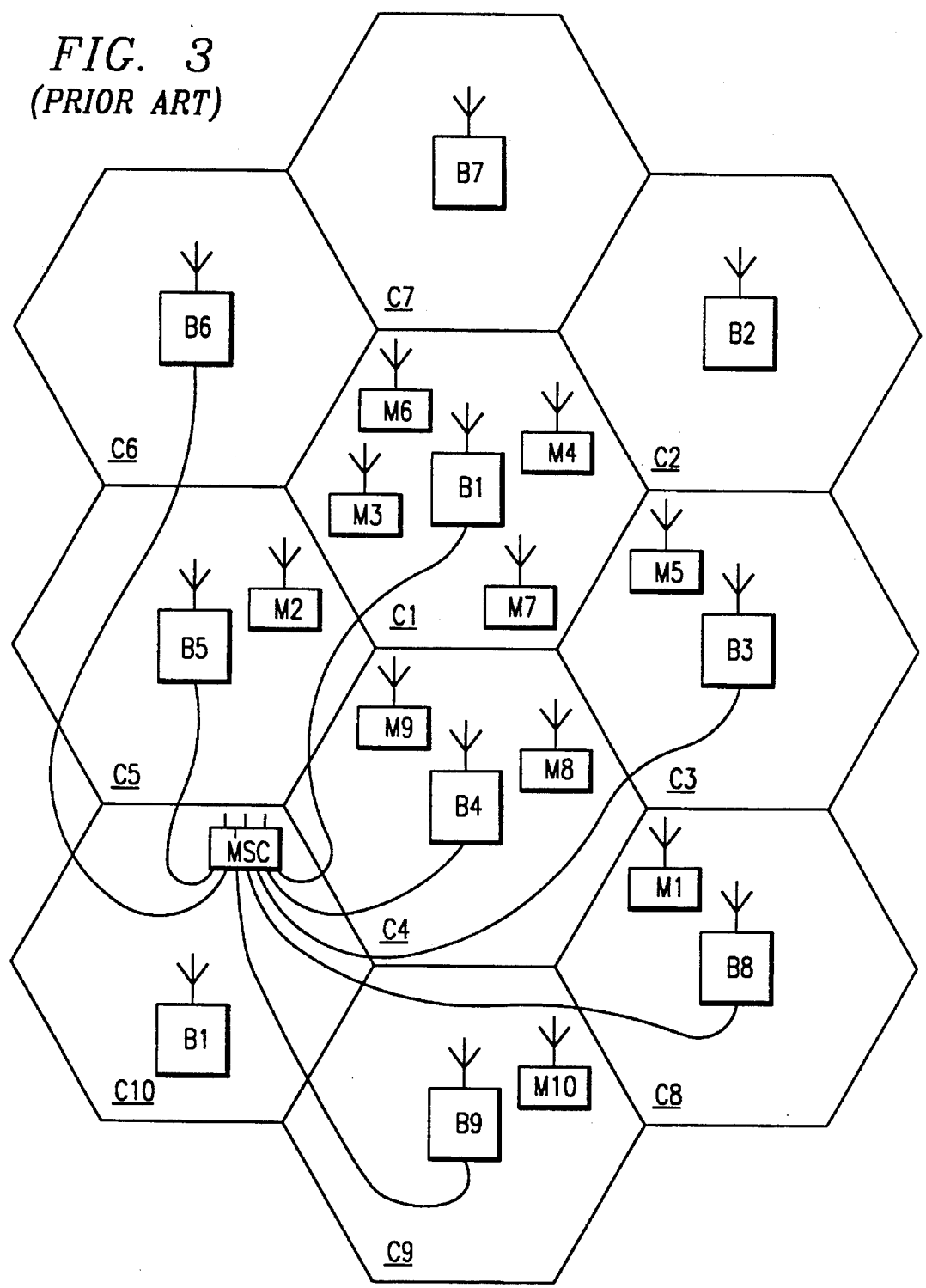
FIG. 3 (Prior Art) is a pictorial representation of a cellular radio communications system including a mobile switching center, a plurality of base stations, and a plurality of mobile stations.

FIG. 3 illustrates a conventional cellular radio communications system of the type to which the present invention generally pertains. In FIG. 3, an arbitrary geographical area may be divided into a plurality of contiguous radio coverage areas, or cells C1–C10. While the system of FIG. 3 is illustratively shown to include only 10 cells, it should be clearly understood that in practice the number of cells may be much larger.

Associated with and located within each of the cells C1–C10 is a base station designated as a corresponding one of a plurality of base stations B1–B10. Each of the base stations B1–B10 includes a transmitter, receiver, and base station controller as are well known in the art. In FIG. 3, the base stations B1–B10 are illustratively located in the center of each of the cells C1–C10, respectively, and are equipped with omni-directional antennas. However, in other configurations of a cellular radio system, the base stations B1–B10 may be located near the periphery or otherwise away from the centers of the cells C1–C10 and may illuminate the cells C1–C10 with radio signals omni-directionally or directionally. Therefore, the representation of the cellular radio system of FIG. 3 is for purposes of illustration only and is not intended as a limitation on the possible implementations of the cellular radio system within which the system of the present invention is implemented.

With continuing reference to FIG. 3, a plurality of mobile stations M1–M10 may be found within the cells C1–C10. Again, only 10 mobile stations are shown in FIG. 3, but it should be understood that the actual number of mobile stations may be much larger in practice and will invariably greatly exceed the number of base stations. Moreover, while none of the mobile stations M1–M10 may be found in some of the cells C1–C10, the presence or absence of the mobile stations M1–M10 in a particular one of the cells C1–C10 should be understood to depend, in practice, on the individual desires of the operators of mobile stations M1–M10 who may roam from one location in a cell to another, or from one cell to an adjacent or neighboring cell, and even from one cellular radio system served by a mobile switching center (MSC) to another such system.

Each of the mobile stations M1–M10 is capable of initiating or receiving a telephone call through one or more of the base stations B1–B10 at an MSC. The MSC is connected by communication links, e.g., cables, to each of the illustrative base stations B1–B10 and to the fixed public switch telephone network (PSTN) (not shown), or to a similar fixed network which may include an integrated services digital network (ISDN) facility. The relevant connections between the mobile switching center MSC and the base stations B1–B10, or between the mobile switching center MSC and the PSTN or ISDN, are not completely shown in FIG. 3, but are well known to those of ordinary skill in the art. Similarly, it is also known to include more than one mobile switching center in a cellular radio system and to connect each additional mobile switching center to a different group of base stations and to other mobile switching centers via cable or radio links.

Associated with the cellular radio system of FIG. 3, there are also one or more home location registers (HLR) which store information concerning each of the mobile stations M1–M10 which may be associated with that particular HLR. Additionally, the system may include one or more visiting location registers (VLR) which store information concerning mobile stations which are associated with other home locations, but which have roamed into the geographic area served by that cellular system.

Each of the cells C1–C10 is allocated a plurality of voice or speech channels and at least one access or control channel, such as a forward control channel (FOCC). The control channel i s us ed to control or supervise the operation of mobile stations by means of information transmitted to and received from those units. Such information is particularly useful when a mobile station travels out of the radio coverage of one cell into the radio coverage of another cell, and may include incoming call signals, outgoing call signals, page signals, page response signals, location redirection signals, voice channel assignments, and maintenance instructions. The control or voice channels may operate either in analog or digital mode or a combination thereof. Additionally, control signals are sent between each of the MSCs, HLRs, VLRs, and PSTNs connected within a network in order to route and complete telephone calls to and from the mobile stations M1–M10 located within the cellular radio system shown in FIG. 3.

Figures 4, 12:
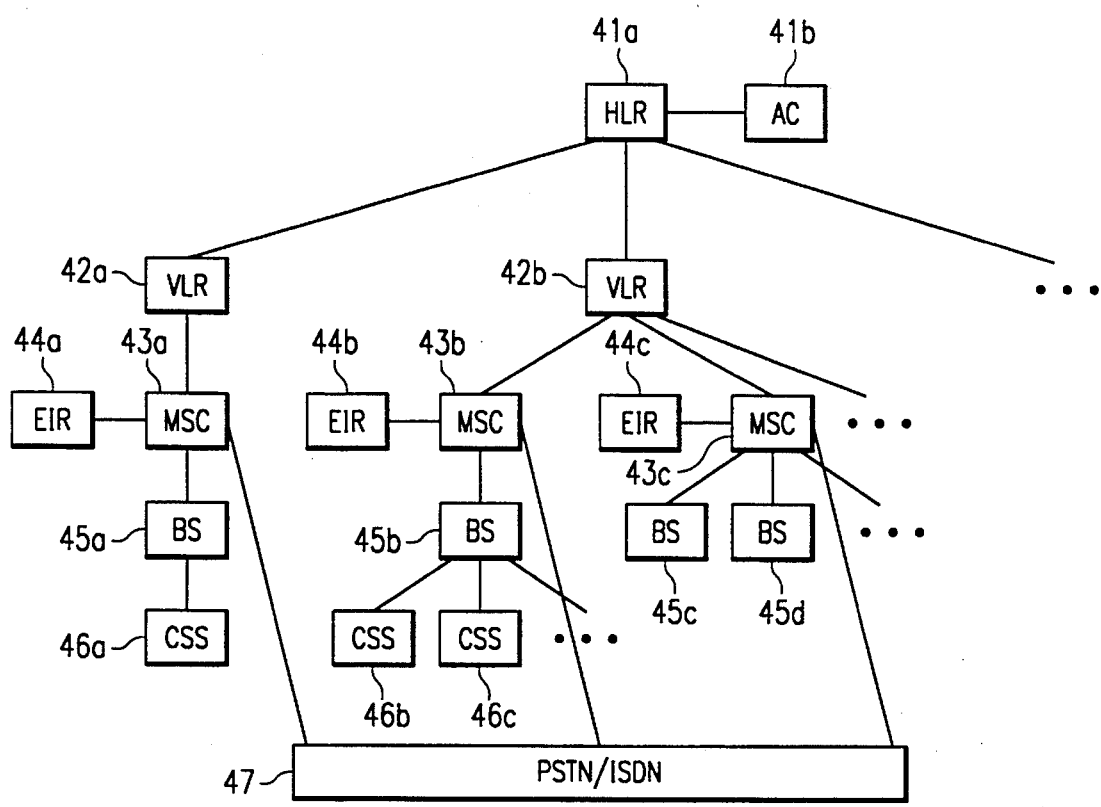
FIG. 4 (Prior Art) is a pictorial block diagram illustrating in more detail the inter-connection of various MSCs, HLRs, and VLRs within a cellular radio network within which the present invention may be practiced.
FIG. 12 is an illustrative indication of a Billing ID message in one embodiment of the present invention.

FIG. 4 illustrates in more detail a hierarchial implementation of the various IS-41 functional entities that may comprise a cellular telephone network. Actual implementations may vary with respect to the manner in which functional entities are distributed among various physical units. In cases where functional entities are combined in the same physical equipment, the interfaces become internal and need not adhere to interface standards.

In FIG. 4, an HLR 41a and its associated authentication center (AC) 41b may interface with a plurality of VLRs such as VLR 42a and VLR 42b covering different geographic regions. An AC is a functional entity which may manage encryption for an individual subscriber, if encryption functions are provided within a particular cellular network. Each VLR may, in turn, interface with one or more MSCs 43a. VLR 42a, for example, may interface with a single MSC 43a–c while VLR 42b may interface with MSCs 43b and 43c, or more. Each MSC 43a–c is associated with an equipment identity register (EIR) 43a–c which maintains records of subscriber equipment. At the next level, each MSC interfaces with one or more base stations (BSs) 45a–d. Each BS, in turn, may interface with zero, one, or a plurality of cellular subscriber stations (CSSs) 46a–c. The CSS is the interface equipment used to terminate a radio path at the user side of a transmission. It provides the user with the capability to access network services. Finally, each MSC 43a–c interfaces with the Public Switched Telephone Network (PSTN) and Integrated Services Digital Network (ISDN) 47 which are defined in accordance with their applicable ANSI T1 standards.

Figure 1:
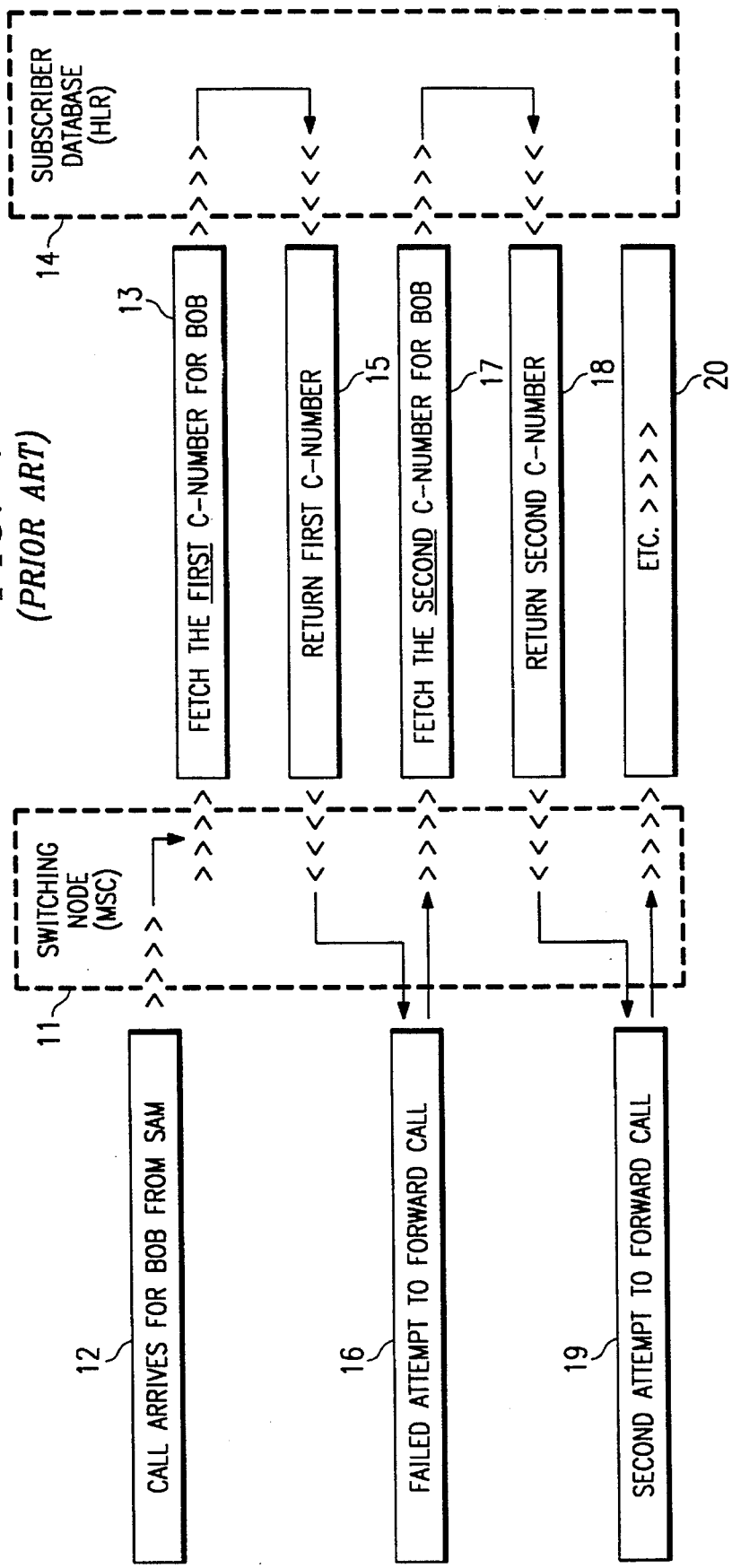
FIG. 1 (Prior Art) is a simplified flow diagram illustrating the steps performed by an existing call-forwarding system in which a mobile switching center uses an index-parameter method of forwarding a single call to a sequence of C-numbers retrieved from a subscriber database.
Figure 2:
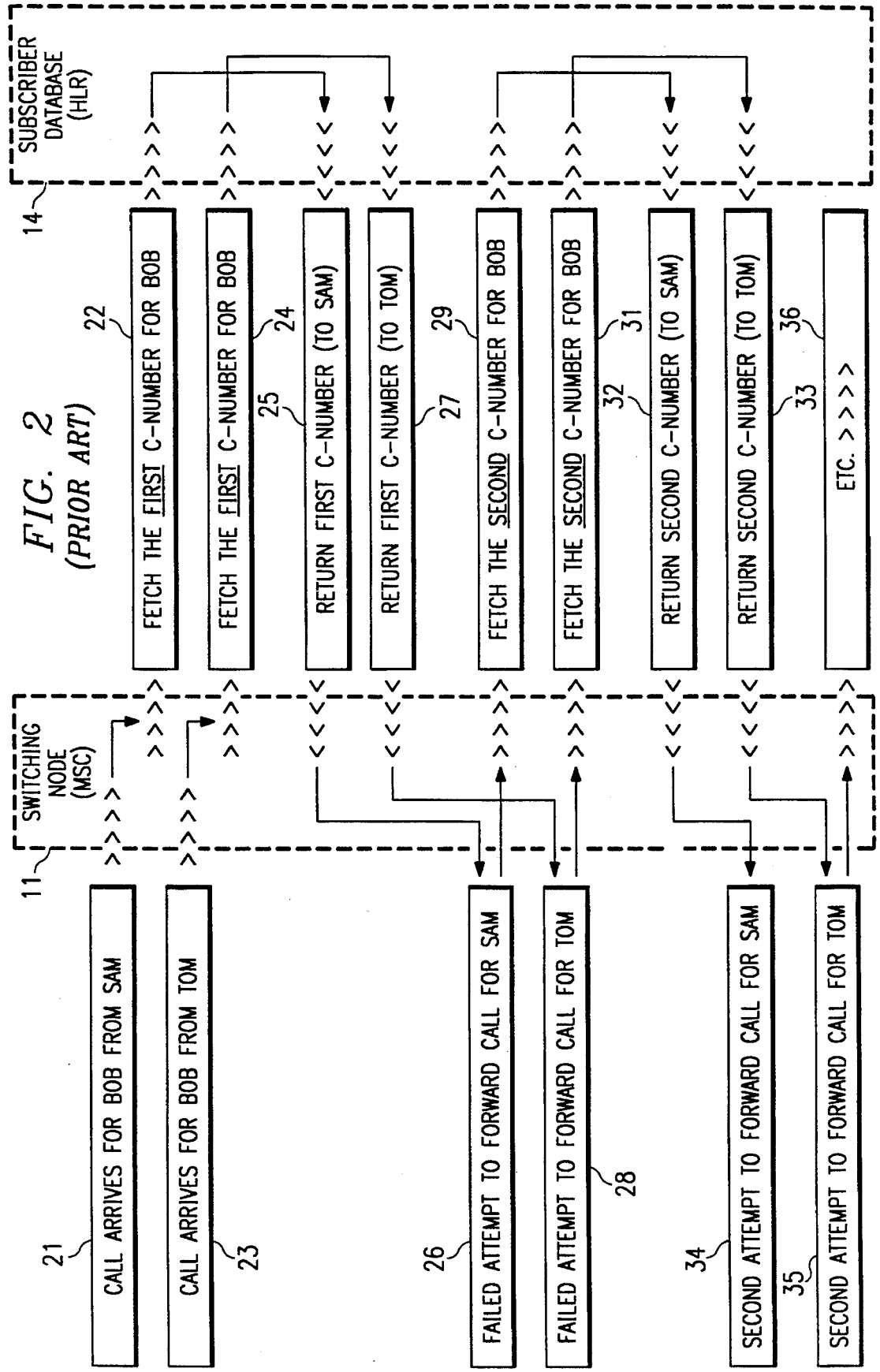
FIG. 2 (Prior Art) is a simplified flow diagram illustrating the steps performed by an existing call-forwarding system in which a mobile switching center uses an index-parameter method of forwarding two near-simultaneous calls to a sequence of C-numbers retrieved from a subscriber database.

FIG. 5 is a simplified flow diagram illustrating the steps performed by the present invention in which a home location register coordinates the forwarding of near-simultaneous calls to a sequence of C-numbers retrieved from a subscriber database. FIG. 5 illustrates in simplified fashion how call forwarding is handled by the present invention in the situation of FIG. 2 in which two calls arrive near simultaneously for "Bob" from both "Sam" and "Tom". At steps 51 and 52, calls arrive at the MSC 11 near simultaneously for Bob from Sam and Tom, respectively. At steps 53 and 54, the MSC 11 forwards requests to the HLR 14 to retrieve a C-number-for-Bob, for Sam, and a C-number-for-Bob, for Tom. Software in the HLR 14 may decide at step 55 that the first C-number is appropriate for Sam while the second C-number is appropriate for Tom. Thereafter, at steps 56 and 57, the first C-number is returned to the MSC 11 for Sam, and the second C-number is returned for Tom. The MSC 11 then attempts to forward the two calls to the two different C-numbers.

Although several different outcomes are possible in this scenario, the remainder of this illustration assumes that, for example, the attempt to forward the call for Sam to the first C-number fails at step 58, and the attempt to forward the call for Tom to the second C-number is successful at step 59. Thereafter, at step 61, the MSC 11 again forwards a request to the HLR 14 to retrieve a C-number-for-Bob, for Sam. At step 62, the HLR 14 may decide to skip to the third C-number since the second C-number was just used for Tom. At step 63, the third C-number is returned to the MSC 11 for the second attempt to forward Sam's call, which occurs at step 64. This process is repeated at step 65 until the call is completed, the call is terminated, or the C-number list is exhausted.

Thus, it can be seen that the present invention provides for the efficient use of C-numbers in call forwarding. The HLR 14 is the central point of coordination, and it retrieves and distributes C-numbers based on intelligent, real-time decisions. The simple two-call situation illustrated in FIG. 5 is handled without the inefficiencies of other existing or proposed systems which may simultaneously forward two calls to the same C-number. More complex scenarios may involve features which allow a high number of near simultaneous calls to arrive on numerous "gateway" MSCs. Multiple MSCs may be attached to a single HLR (FIG. 4), and more than one MSC may be transacting calls to the same party. The present invention allows efficient coordination of such calls to take place in the HLR.

Figure 6:
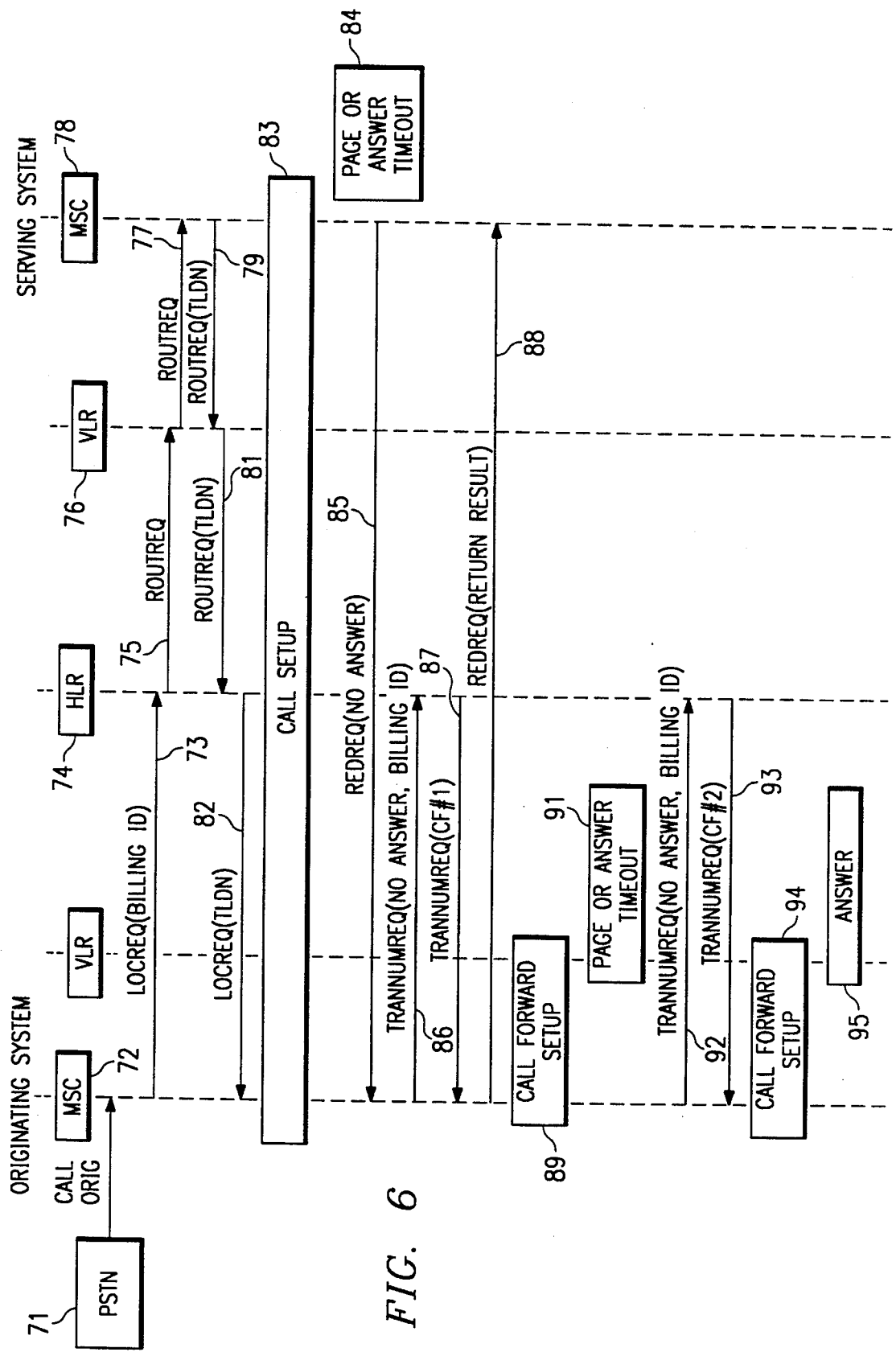
FIG. 6 illustrates in more detail a flow diagram illustrating the signals involved in the completion of a single call, together with the forwarding of that call to two successive C-numbers in accordance with one embodiment of the present invention.

FIG. 6 illustrates in more detail a signalling diagram illustrating the completion of a call together with the forwarding of that call to two successive C-numbers in accordance with one embodiment of the present invention. A call origination and directory number of the mobile station for which the call is intended is sent from a PSTN network 71 to an originating MSC 72. Next, the originating MSC 72 sends a Location Request Invoke message 73 containing a unique number to the mobile station's HLR 74. The unique number selected for use in the preferred embodiment of the present invention is a Billing ID number which is a number unique to each call which is used in existing cellular radio networks in accordance with IS-41 to collect information for billing purposes on the length of each call and the services provided. The Location Request Invoke 73 requests information concerning the current location of the specified mobile station and asks for routing instructions.

In response to the Location Request Invoke 73, the HLR 74 constructs a Route Request Invoke message 75, and sends it to a VLR 76 that last provided a registration notification for the mobile station for which the call is intended. The Route Request Invoke inquires as to the preferred method of routing pending calls to a visiting mobile station. The VLR 76 forwards the Route Request Invoke 75 to a serving MSC 78 covering the geographic location where the mobile station is currently found. In response to the Route Request Invoke 75, the serving MSC 78 checks its internal data structures and may, for example, determine that the mobile station is currently idle. The MSC 78 then allocates a temporary local directory number (TLDN) and returns this information to the VLR 76 in a Route Request Return Result message 79. The VLR 76, in turn, forwards the Route Request Return Result to the HLR 74 at 81. The HLR 74 adds location information to the message and returns a Location Request Return Result message 82 to the originating MSC 72 which originally sent the Location Request Invoke 73. The call is set up at 83 in the conventional manner.

In the event the call set up at 83 cannot be completed because of either lack of a page response by the mobile station or time-out due to no answer by the mobile station at 84, the serving MSC 78 determines from the subscriber profile whether the mobile station has call forwarding activated. If the mobile station has call forwarding activated, the serving MSC 78 returns to the originating MSC 72, a Redirection Request Invoke message 85 indicating that the call is being redirected due to a no answer condition. If the originating MSC 72 is able to redirect the call, it transmits a Transfer-to-Number Request Invoke message 86 to the HLR 74 indicating that there was no answer, including the Billing ID, and requesting the C-number from the HLR's database to which the call should be forwarded. In response, the HLR 74 returns a Transfer-to-Number Request Return Result message 87 containing a first call forwarding number from the C-number list stored in the database of the HLR associated with the mobile station for which the call was originally intended. The C-number is chosen from the database based on a the Billing ID, an associated time stamp, and on preprogrammed logic instructions in the HLR which are programmed to select the C-number most likely to result in a successful connection. Simple logic instructions may, for example, provide a higher priority to certain C-numbers at different times of the day or on different days of the week. In response to the message containing the first call forwarding number 87, the originating MSC 72 sends a Redirection Request Return Result message 88, ending the connection to the serving MSC 78, and at the same time, initiates call forwarding to the specified C-number at 89.

It should be noted that if the serving MSC 78 is able to redirect the call, then it is not necessary to send the Redirection Request Invoke 85 to the originating MSC 72. Instead, the serving MSC 78 sends a Transfer-to-Number Request Invoke directly to the HLR 74 which, in turn, returns the C-number to the serving MSC 78. This situation requires that the originating MSC 72 remain connected to the serving MSC 78 until the end of the call.

If the originating MSC 72 is attempting to forward the call, and again, the call cannot be completed due to the lack of a page response by the mobile station, or an answer time-out at 91, the originating MSC 72 sends to the HLR 74, a second Transfer-to-Number Request Invoke 92 indicating that there was no answer, including the Billing ID, and requesting another C-number from the HLR's database to which the call should be forwarded. In response, the HLR 74 transmits to the originating MSC 72, a second Transfer-to-Number Request Return Result 93 containing a second call forwarding number comprising the C-number which is the next most likely C-number to result in a successful connection, consistent with the Billing ID and the preprogrammed logic instructions in the HLR. Thereafter, another call forward setup is performed at 94, followed by an answer by that party at 95.

Thus, it can be seen how the use of an arbitrary number such as the Billing ID associated with each Transfer-to-Number Request Invoke to the HLR 74 enables that HLR to continue to respond locally to transfer-to-number requests. A sequence of numbers to which the call is to be forwarded can be retrieved from the HLR's database, enabling the HLR to maintain local control as well as to provide a record of the specific number to which the call was forwarded, for call management purposes.

FIG. 7 is an illustrative indication of the standard message format from IS-41 of a Location Request message sent from an MSC to an HLR (Invoke), and from the HLR back to the MSC (Return Result ). Within the "invoke parameters", two parameters are of significance to the present invention: "Digits (dialled)" and "Billing ID" Digits (dialled) reflects the B-number or called party. Billing ID is a unique number which identifies a particular call and collects all information relative to call length and services provided to facilitate the billing of the subscriber.

FIG. 8 is an illustrative indication of the standard message format from IS-41 of a Route Request message sent from an MSC or an HLR to the serving MSC (Invoke), and from the serving MSC back to the HLR or originating MSC (Return Result). The routing request message is used to enquire as to the preferred method of routing a pending call to a visiting subscriber. Within the "invoke parameters", two parameters are of significance to the present invention: "Mobile Identification Number" and "Billing ID". The Mobile Identification Number reflects the B-number or called party. The B-number, which was carried by the "Digits (dialled)" parameter of the Location Request Invoke, is mapped over to the Mobile Identification Number in the Route Request Invoke. The Billing ID parameter once again is the unique number necessary to gather all billing information on a particular call.

FIG. 9 is an illustrative indication of the standard message format from IS-41 of a Redirection Request message sent from the serving MSC to the originating MSC (Invoke), and from the originating MSC back to the serving MSC (Return Result). The Mobile Identification Number (B-number) and the Billing ID are once again carried forward in the invoke parameters of the Redirection Request message.

FIG. 10 is an illustrative indication of the standard message format from IS-41 of a Transfer-to-Number Request message sent from an MSC to the HLR serving the specified mobile station (Invoke), and from the HLR to the MSC ( Return Result ). The Mobile Identification Number (B-number) is once again carried forward in the invoke parameters of the Redirection Request message. The Billing ID, however, is not carried forward in the IS-41 format of the Transfer-to-Number Request message. The Billing ID is not included in this message because the action which this message invokes, the providing of a call-forwarding C-number by the HLR, is not a billable event. Therefore, the Billing ID, which has historically been used only to collect billable events, has not been included in the past.

The present invention adds the Billing ID to the invoke parameters of the Transfer-to-Number Request message shown in FIG. 10. As a result, the Billing ID is carried forward by each of the messages required to set up a call, redirect a call, and retrieve a C-number for call forwarding, i.e. , the Location Request message (FIG. 7), the Route Request message (FIG. 8), the Redirection Request message (FIG. 9), and the Transfer-to-Number Request message (FIG. 10).

It should be noted that while the B-number undergoes changes in nomenclature as a call passes through the phases of call forwarding and connection, the Billing ID is carried forward through this process unchanged. This characteristic makes the Billing ID an excellent parameter for use in the present invention to deliver call-forwarding messages to the various components of the cellular radio network, and to correlate responses back to a single call.

Figure 11:
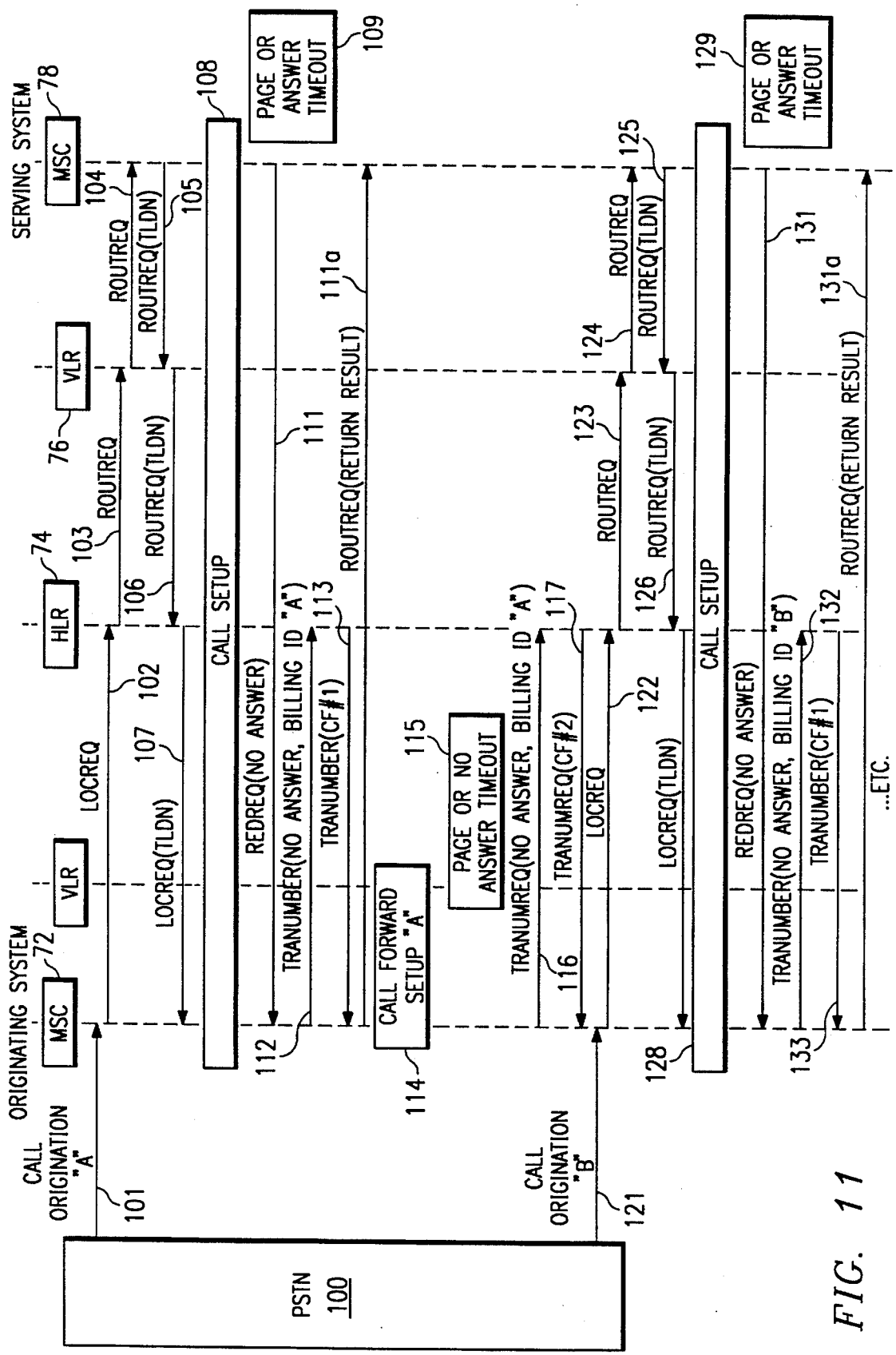
FIG. 11 illustrates in more detail a flow diagram illustrating the signals involved in the completion of two near-simultaneous calls, together with the forwarding of those calls to two successive C-numbers in accordance with one embodiment of the present invention.

FIG. 11 illustrates in more detail a flow diagram illustrating the signals involved in the completion of two near-simultaneous calls, together with the forwarding of those calls to two successive C-numbers in accordance with one embodiment of the present invention. As illustrated in FIG. 11, a PSTN network 100 provides a first call origination "A" 101 and a second call origination "B" 121 to the originating MSC 72. In response to call origination "A" 101, the originating MSC 72 sends a Location Request Invoke 102 to the mobile station's HLR 74 which constructs a Route Request Invoke 103 and forwards it to the VLR 76 with which the mobile station being called is currently associated. The Route Request Invoke is, in turn, forwarded at 104 to the serving MSC 78 covering the geographic location where the mobile station is currently found. The serving MSC 78 checks its internal data structures and may determine, for example, that the mobile station is idle. The serving MSC 78 allocates a TLDN and returns this information to the VLR 76 in a Route Request Return Result 105, which is then forwarded to the HLR 74 at 106. The HLR 74, in turn, adds location information to the message and forwards a Location Request Return Result 107 to the originating MSC 72. Call "A" is set up at 108 in the conventional manner.

In the event of a failure to complete the call due to the failure of the mobile station to answer the page, or due to a no-answer time-out at 109, the serving MSC 78 returns a Redirection Request Invoke 111 to the originating MSC 72 indicating that the call is being redirected due to a no answer condition. I f the originating MSC 72 is able to redirect the call, it sends to the HLR 74, a Transfer-to-Number Request Invoke 112 indicating that there was no answer, including a Billing ID "A", and requesting a call-forwarding C-number. The HLR 74 returns to the originating MSC 72, an optimum call forwarding C-number in a Transfer-to-Number Request Return Result 113. The originating MSC 72 sends a Redirection Request Return Result 111a to the serving MSC 78 to close the communications with the serving MSC 78. The originating MSC 72 then attempts to forward the call to the retrieved C-number in a call forward setup "A" at 114.

If again, Call "A" cannot be completed due to the failure of the called party to answer a page, or due to a no-answer time-out at 115, the originating MSC 72 sends a second Transfer-to-Number Request Invoke 116 to the HLR 74. Message 116 indicates that there was no answer, and once again includes Billing ID "A" since Call "A" has not yet been completed. In response, the HLR 74 sends a second Transfer-to-Number Request Return Result 117 containing a second call forwarding C-number to the originating MSC 72, and the originating MSC 72 again attempts to complete Call "A".

Meanwhile, during the attempts to complete Call "A", a second call origination "B" 121, directed to the same B-number, may be provided from the PSTN network 100 to the originating MSC 72. A second Location Request Invoke 122 is sent to the HLR 74 which constructs a Route Request Invoke 123 and forwards it to the VLR 76 with which the mobile station being called is currently associated. The Routing Request Invoke is, in turn, forwarded at 124 to the serving MSC 78 covering the geographic location where the mobile station is currently found. The serving MSC 78 checks its internal data structures and may determine, for example, that the mobile station is idle. The serving MSC 78 allocates a TLDN and returns this information to the VLR 76 in a Route Request Return Result 125, which is then forwarded to the HLR 74 at 126. The HLR 74, in turn, adds location information to the message and forwards a Location Request Return Result 127 to the originating MSC 72. Call "B" is set up at 128 in the conventional manner.

In the event of a failure to complete the call due to the failure of the mobile station to answer the page, or due to a no-answer time-out at 129, the serving MSC 78 returns a Redirection Request Invoke 131 to the originating MSC 72 indicating that the call is being redirected due to a no-answer condition. If the originating MSC 72 is able to redirect the call, it sends to the HLR 74, a Transfer-to-Number Request Invoke 132 indicating that there was no answer, including a Billing ID "B", and requesting a call-forwarding C-number. The HLR 74 returns to the originating MSC 72, an optimum call forwarding C-number in a Transfer-to-Number Request Return Result 133. In determining the optimum C-number, the HLR 74 relies on internal logic which may consider, for example, the fact that a certain C-number was nearly simultaneously forwarded in response to Call "A". The originating MSC 72 sends a Redirection Request Return Result 131a to the serving MSC 78 ending communications with the serving MSC 78. The originating MSC 72 then attempts to forward the call to the retrieved C-number in a call forward setup "B" (not shown). In the manner described above for Call "A", the present invention will continue to forward Call "B" to additional call forwarding numbers. In this manner, multiple calls for the same mobile station are effectively transferred and redirected through a sequence of C-numbers by the present invention.

Referring next to FIG. 12, there is shown an illustrative indication of a Billing ID message illustrating that the ID message may be formatted into seven octets of data comprising the switch ID (SWID), the Billing ID number itself, and a segment count. Octets 1 and 2 of the message comprise the anchor SID number, while octet 3 contains the anchor switch number. Octets 4 and 5 are the Billing ID number itself, and octet 7 comprises the segment count. Bits 1–7 of the segment count indicate the number of inter-system handoffs which have been accomplished in a particular sequence. Bit 8 indicates the serving MSC upon call disconnect. As can be understood, other random numbers might be used in the present invention to identify particular requests for the forwarding of calls to a particular mobile station. However, the Billing ID may be readily adapted for this function.

Figure 13:
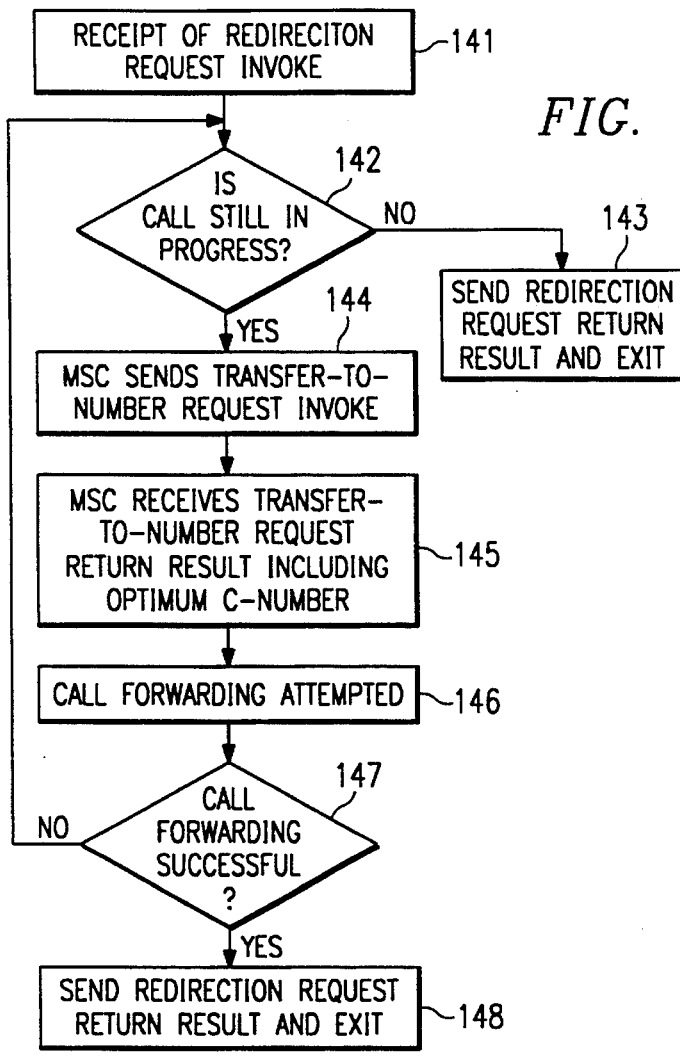
FIG. 13 is a logic flow diagram of actions taken by an originating mobile switching center (MSC) upon receipt of a Redirection Request Invoke message in order to invoke a Transfer-to-Number request.

FIG. 13 is a logic flow diagram of actions taken by an originating mobile switching center (MSC) upon receipt of a Redirection Request Invoke message in order to invoke a Transfer-to-Number request. At step 141, an originating MSC receives a Redirection Request Invoke from a serving MSC. At step 142, the program determines whether or not the call is still in progress. If the call is not in progress, the originating MSC sends a Redirection Request Return Result to the serving MSC and exits the routine at step 143. If the call is still in progress, then the program moves to step 144 where the originating MSC sends a Transfer-to-Number Request Invoke to the HLR serving the mobile station to which the call is addressed. The Transfer-to-Number Request Invoke includes a Billing ID and requests the C-number from the HLR's database to which the call should be forwarded. At step 145, the originating MSC receives a Transfer-to-Number Request Return Result from the HLR which includes a first call-forwarding number from the C-number list. At step 146, the originating MSC initiates call forwarding to the specified C-number. At step 147, the program determines whether or not the call-forwarding attempt was successful. If the attempt was successful, the originating MSC sends a Redirection Request Return Result to the serving MSC and exits the routine at step 148. If the attempt was not successful, the program returns to step 142 where it determines once again whether or not the call is still in progress. The program will continue to retrieve C-numbers and attempt to forward the call in this manner until the call is connected, the call is terminated, or the C-number list is exhausted.

Figure 14:
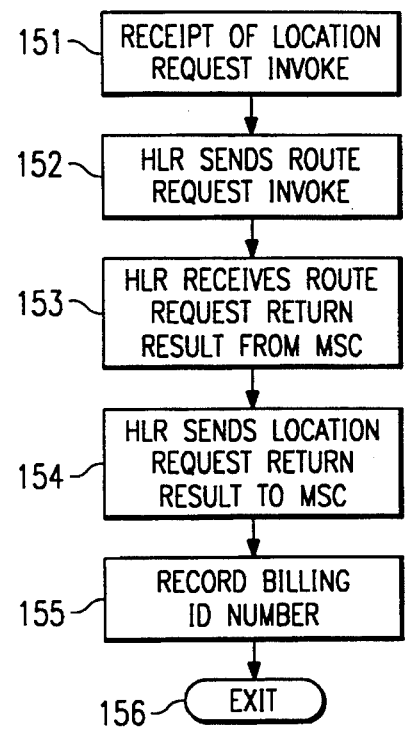
FIG. 14 is a logic flow diagram of actions taken by an HLR upon receipt of a Location Request Invoke message in accordance with the teachings of the present invention.

FIG. 14 is a logic flow diagram of actions taken by an HLR upon receipt of a Location Request Invoke message in accordance with the teachings of the present invention. At step 151, the HLR receives a Location Request Invoke from an originating MSC, which includes the parameters "Digits (dialled)" (the so-called B-number) and the "Billing ID". At step 152, the HLR sends a Route Request Invoke to the VLR or serving MSC where the called mobile station may be found. The Route Request Invoke includes a Mobile Identification Number (the so-called B-number) and the Billing ID. At step 153, the HLR receives a Route Request Return Result from the serving MSC and sends a Location Request Return Result to the originating MSC at 154. At step 155, the HLR records the Billing ID associated with this call. The program then exits the routine at step 156.

Figure 15:
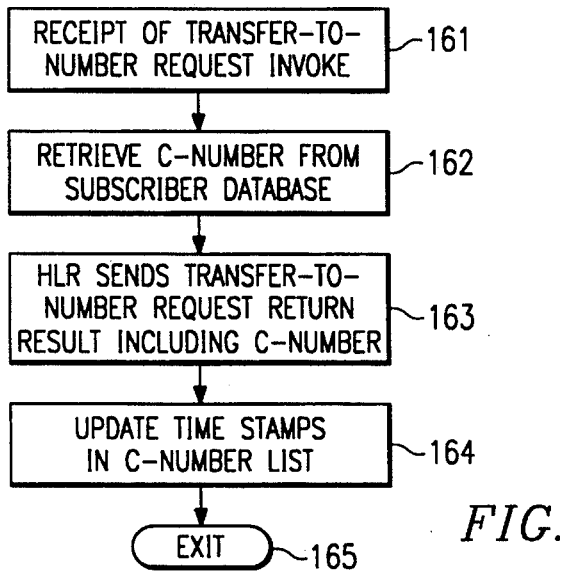
FIG. 15 is a logic flow diagram of actions taken by an HLR upon receipt of a Transfer-to-Number Request Invoke showing one use of a Billing ID to traverse a C-number list in accordance with the teachings of the present invention.

FIG. 15 is a logic flow diagram of actions taken by an HLR upon receipt of a Transfer-to-Number Request Invoke showing one use of a Billing ID to traverse a C-number list. The C-number list may be, for example, a database of C-numbers, each associated with paired sets of Billing IDs and "time stamps". A time stamp may indicate the time at which a particular C-number was retrieved for a particular Billing ID, thereby providing a historical record of the times that each C-number was most recently used in association with each Billing ID.

As used in the present invention, the Transfer-to-Number Request Invoke includes a Billing ID number and a Mobile Identification Number which is the number of the called mobile station. Since the Billing ID is associated with a particular calling party, the HLR uses the Billing ID to track which C-numbers have been requested for a particular party. Since the Mobile Identification Number is associated with a particular called mobile station, the HLR uses the Mobile Identification Number to track how many calling parties are attempting to call the same mobile station. The HLR is thus able to retrieve the optimum C-number under complex scenarios of multiple calling parties and multiple call-forwarding attempts for one or more of those parties.

At step 161, the HLR receives a Transfer-to-Number Request Invoke from an originating MSC, which includes the Billing ID associated with a particular calling party. At step 162, the HLR retrieves a C-number from the C-number list in the HLR's subscriber database. To accomplish this, the HLR inspects the C-number list for all C-numbers which have not been previously used to forward a call for this particular Billing ID. The HLR further refines this selection based on criteria such as associated time stamps, and thereby selects C-numbers which are most likely not already in use. Other priority criteria may include the identity of the calling party, the time of day or day of the week, etc. At step 163, the HLR sends a Transfer-to-Number Request Return Result to the originating MSC, which includes the C-number retrieved. At step 164, the HLR updates the C-number list to reflect C-numbers used by the Billing ID, by updating the associated time stamps. The HLR then exits the routine at step 165.

If the originating MSC is unsuccessful in forwarding the call to the first C-number retrieved, it sends another Transfer-to-Number Request Invoke to the HLR. The HLR recognizes the same Billing ID and uses the updated sets of unique identification numbers and time stamps with the programmable logic instructions to retrieve the C-number with the next highest priority. This process continues until the call is connected, the call is terminated, or the C-number list is exhausted.

As can be seen from the above description, the present invention allows a cellular communication system to provide a sequence of C-numbers to which calls may be forwarded in the event a call to a particular mobile station cannot be completed. These call forwarding C-numbers may be sequentially executed under control of only the HLR and without incorporating additional data into the call control information within the MSC attempting to complete the call.

It is believed that the operation and construction of the present invention will be apparent from the foregoing description and, while the method and apparatus shown and described has been characterized as being preferred, obvious changes and modifications may be made therein without departing from the spirit and scope of the invention as defined in the following claims.

What is claimed is:

1. A method of forwarding a plurality of incoming telephone calls from a plurality of calling parties for a mobile station to a sequence of call-forwarding numbers within a conventional cellular radio telephone system, said incoming telephone calls arriving with a time interval between calls that is less than the time required to return one of said call forwarding numbers to one of said plurality of calling parties, said method comprising the steps of:

designating a home location register (HLR) for said mobile station;

storing said sequence of call-forwarding numbers in a database in said HLR;

transmitting, for each of said plurality of incoming telephone calls from a plurality of calling parties, a corresponding request message to said HLR requesting a call-forwarding number from said sequence of call-forwarding numbers, said corresponding request message including a unique call identification number;

retrieving add forwarding a different one of said sequence of call-forwarding numbers for each one of said plurality of incoming telephone calls; and maintaining a record between said unique call identification number and said sequence of call forwarding numbers to mark those certain ones of said sequence of call-forwarding numbers that have been retrieved for each one of said plurality of request messages and to identify those ones of said sequence of forward-to-numbers which have not been retrieved and which are available for retrieval in response to a subsequently received request message.

2. The method of claim 1 further comprising the step of:

programming the HLR to retrieve from said HLR database, in response to each request message received, a call-forwarding number with the highest probability of completing the call corresponding to the received request message by utilizing said sequence of call-forwarding numbers and a set of programmable logic instructions stored within said HLR.

3. The method of claim 2 wherein the step of maintaining said record includes identifying each of said call-forwarding numbers with paired sets of unique call identification numbers and corresponding time stamps reflecting the most recent time each of said call-forwarding numbers was retrieved for each of said plurality of calling parties.

4. The method of claim 3 wherein the step of maintaining said record includes instructing the HLR to forward, each time a request message is received by said HLR, said call-forwarding number with the highest probability of completing the call corresponding to the received request message, said call-forwarding number being forwarded to the calling party identified by said unique call identification number.

5. The method of claim 4 further comprising the step of attempting to forward each of said plurality of incoming telephone calls to the retrieved call-forwarding number having the highest probability of completing each of said calls.

6. The method of claim 5 further comprising the step of updating said paired sets of unique call identification numbers and time stamps for each attempt to forward each of said plurality of incoming telephone calls.

7. The method of claim 6 further comprising the step of retrieving a call-forwarding number from said HLR database, said call-forwarding number having the next highest probability of completing the call corresponding to the received request message by utilizing said updated paired sets of unique call identification numbers and time stamps and said set of programmable logic instructions.

8. The method of claim 7 further comprising repeating the steps of sequentially retrieving said call-forwarding numbers and attempting to forward each of said plurality of incoming telephone calls until said calls are completed, said calls are terminated, or said sequence of call-forwarding numbers is exhausted.

9. A method of forwarding a plurality of incoming telephone calls to a sequence of C-numbers on a call-forwarding priority list for a mobile station within a conventional cellular radio communications system having a mobile switching center (MSC) in communication with a home location register (HLR) associated with said mobile station, said incoming telephone calls arriving with a time interval between calls that is less than the time required to retrieve one of said C-numbers from said HLR, said method comprising the steps of:

storing in said HLR, a sequence of C-numbers to which each of said plurality of incoming telephone calls is to be forwarded in the event a call cannot be completed to said mobile station;

transmitting a single transfer-to-number request message from said MSC to said HLR for each of said plurality of incoming telephone calls, said transfer-to-number including a unique call identification number;

analyzing within said HLR, said transfer-to-number request messages and said call-forwarding priority list, to determine the C-number with the highest probability of completing each of said plurality of incoming telephone calls;

transmitting from said HLR to said MSC, the C-number from said call-forwarding priority list with the highest probability of completing each of said plurality of incoming telephone calls in response to each of said request messages; and maintaining a record between said unique call identification number and said sequence of C-numbers to mark those certain ones of said sequence of C-numbers that have been transmitted for each one of said plurality of request messages and to identify those ones of said sequence of C-numbers which have not been transmitted and which are available for transmission in response to a subsequently received request message.

10. The method of claim 9 further comprising the step of attempting to complete each of said plurality of calls from said MSC to said C-number with the highest probability of completing each call.

11. The method of claim 10 further comprising the step of sequentially retrieving said C-numbers from said call-forwarding priority list, and attempting to complete each of said plurality of calls, until said calls are completed, said calls are terminated, or said call-forwarding priority list is exhausted.

12. The method of claim 11 wherein said step of transmitting each of said transfer-to-number request messages with said unique call identification number includes transmitting each of said transfer-to-number request messages with a Billing ID number.

13. A system for forwarding a plurality of incoming telephone calls from a plurality of calling parties for a mobile station to a sequence of call-forwarding numbers within a conventional cellular radio telephone network, said incoming telephone calls arriving with a time interval between calls that is less than the time required to return one of said call forwarding numbers to one of said plurality of calling parties, said system comprising:

a home location register (HLR) designated for said mobile station;

means for storing said sequence of call-forwarding numbers in a database in said HLR;

means for transmitting, for each of said plurality of incoming telephone calls from a plurality of calling parties, a corresponding request message to said HLR requesting a call-forwarding number from said sequence of call-forwarding numbers said request message including a unique call identification number;

means for retrieving and forwarding a different one of said sequence of call-forwarding numbers for each one of said plurality of incoming telephone calls; and means for maintaining a record between said unique call identification number and said sequence of call forwarding numbers to mark those certain ones of said sequence of call-forwarding-numbers that have been retrieved for each one of said plurality of request messages and to identify those ones of said sequence of forward-to-numbers which have not been retrieved and which are available for retrieval in response to a subsequently received request message.

14. The system of claim 13 wherein said means for maintaining said record includes means for storing paired sets of time stamps and said unique call identification numbers corresponding to each of said call-forwarding numbers.

15. The system of claim 14 wherein said HLR includes means for retrieving from said HLR database, in response to each request message received, a call-forwarding number with the highest probability of completing the call corresponding to the received request message.

16. The system of claim 15 wherein the means for maintaining said record includes means for associating each of said call-forwarding numbers with said paired sets of unique call identification numbers and corresponding time stamps reflecting the most recent time each of said call-forwarding numbers was retrieved for each of said plurality of calling parties.

17. The system of claim 16 wherein the means for maintaining said record programmable logic instructions which utilize said sequence of call-forwarding numbers to direct the HLR to retrieve a call-forwarding number having the highest probability of completing the call corresponding to the received request message.

18. The system of claim 17 further comprising means for attempting to forward each of said plurality of incoming telephone calls to the retrieved call-forwarding number having the highest probability of completing each of said calls.

19. The system of claim 18 further comprising means for updating said paired sets of unique call identification numbers and time stamps for each attempt to forward each of said plurality of incoming telephone calls.

20. The system of claim 19 wherein said means for retrieving includes means for retrieving a call-forwarding number from said HLR database, said call-forwarding number having the next highest probability of completing the call corresponding to the received request message by utilizing said updated paired sets of unique call identification numbers and time stamps and said programmable logic instructions.

21. The system of claim 20 wherein said means for retrieving includes means for repeatedly retrieving said call-forwarding numbers and attempting to forward each of said plurality of incoming telephone calls until said calls are completed, said calls are terminated, or said sequence of call-forwarding numbers is exhausted.

22. A system for forwarding a plurality of incoming telephone calls to a sequence of C-numbers on a call-forwarding priority list for a mobile station within a conventional cellular radio communications network having a mobile switching center (MSC) in communication with a home location register (HLR) associated with said mobile station, said incoming telephone calls arriving with a time interval between calls that is less than the time required to return one of said call forwarding numbers to one of said plurality of calling parties, said system comprising:

means for storing in said HLR, a sequence of C-numbers to which each of said plurality of incoming telephone calls is to be forwarded in the event a call cannot be completed to said mobile station;

means for transmitting a single transfer-to-number request message from said MSC to said HLR for each of said plurality of incoming telephone calls, said transfer-to-number request message containing a unique call identification number identifying said request message and said calling party on a per-call basis;

means for analyzing within said HLR, said transfer-to-number request messages and said call-forwarding priority list, to determine the C-number with the highest probability of completing each of said plurality of incoming telephone calls;

means for transmitting from said HLR to said MSC, the C-number from said call-forwarding priority list with the highest probability of completing each of said plurality of incoming telephone calls in response to each of said request messages; and means for maintaining a record between said unique call identification number and said sequence of C-numbers to mark those certain ones of said sequence of C-numbers that have been transmitted for each one of said plurality of request messages and to identify those ones of said sequence of C-numbers which have not been transmitted and which are available for transmission in response to a subsequently received request message.

23. The system of claim 22 wherein the means for maintaining said record includes means for storing paired sets of time stamps and said unique identification numbers associated with each of said call-forwarding numbers.

24. The system of claim 23 further comprising means for attempting to complete each of said plurality of calls from said MSC to said C-number with the highest probability of completing each call.

25. The system of claim 24 further comprising means for sequentially retrieving said C-numbers from said call-forwarding priority list, and attempting to complete each of said plurality of calls, until said calls are completed, said calls are terminated, or said call-forwarding priority list is exhausted.

26. The system of claim 25 wherein said unique identification number is a Billing ID number.

* * * * *

UNITED STATES PATENT AND TRADEMARK OFFICE
CERTIFICATE OF CORRECTION

PATENT NO. : 5,579,375  Page 1 of 2
DATED : Nov. 26, 1996
INVENTOR(S) : Ginter

It is certified that error appears in the above-indentified patent and that said Letters Patent is hereby corrected as shown below:

| | |
|---|---|
| Column 1, line 49 | Replace "i n" <br> With --in-- |
| Column 2, line 7 | Replace "also," <br> With --al.,-- |
| Column 7, line 4 | Replace "i s us ed" <br> With --is used-- |
| Column 7, line 33 | Replace "43a." <br> With --43a-c.-- |
| Column 7, line 35 | Replace "43a-c" <br> With --43a-- |
| Column 7, line 37 | Replace "43a-c" <br> With --44a-c-- |
| Column 9, line 67 | Insert a period after ""Billing ID"" |
| Column 11, line 21 | Replace "I f" <br> With --If-- |

UNITED STATES PATENT AND TRADEMARK OFFICE
CERTIFICATE OF CORRECTION

PATENT NO.    : 5,579,375
DATED         : Nov. 26, 1996
INVENTOR(S)   : Ginter

It is certified that error appears in the above-indentified patent and that said Letters Patent is hereby corrected as shown below:

Column 14, line 31      Replace "add"
                            With --and--

Column 16, line 52      After "record"
                            Insert --includes--

Signed and Sealed this

Fourth Day of March, 1997

Attest:

Attesting Officer

BRUCE LEHMAN
Commissioner of Patents and Trademarks